United States Patent
Wang

(10) Patent No.: US 11,181,417 B2
(45) Date of Patent: Nov. 23, 2021

(54) RACK SERVER NOISE MONITORING SYSTEM AND METHOD

(71) Applicant: ZHENGZHOU YUNHAI INFORMATION TECHNOLOGY CO., LTD., Henan (CN)

(72) Inventor: Cong Wang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 268 days.

(21) Appl. No.: 16/475,092

(22) PCT Filed: Jun. 13, 2018

(86) PCT No.: PCT/CN2018/091072
§ 371 (c)(1),
(2) Date: Jun. 29, 2019

(87) PCT Pub. No.: WO2019/047583
PCT Pub. Date: Mar. 14, 2019

(65) Prior Publication Data
US 2019/0331524 A1    Oct. 31, 2019

(30) Foreign Application Priority Data
Sep. 5, 2017 (CN) .......................... 201710791008.8

(51) Int. Cl.
*G01H 11/06* (2006.01)
*H04R 5/027* (2006.01)
*H04R 5/04* (2006.01)

(52) U.S. Cl.
CPC ............ *G01H 11/06* (2013.01); *H04R 5/027* (2013.01); *H04R 5/04* (2013.01)

(58) Field of Classification Search
CPC .................. F04D 25/166; F04D 29/663; F24F 13/24–2013/247; G01H 11/06;
(Continued)

(56) References Cited

U.S. PATENT DOCUMENTS

2007/0223715 A1* 9/2007 Barath ............. G10K 11/17873
                                                    381/71.7
2008/0187147 A1* 8/2008 Berner ................... F24F 13/24
                                                    381/71.3
(Continued)

FOREIGN PATENT DOCUMENTS

CN       202420664 U      9/2012
CN       105300706 A      2/2016
(Continued)

OTHER PUBLICATIONS

International Search Report for PCT/CN2018/091072 dated Sep. 17, 2018, ISA/CN.

*Primary Examiner* — David L Singer
(74) *Attorney, Agent, or Firm* — Yue (Robert) Xu; Apex Attorneys at Law, LLP

(57) ABSTRACT

A rack server noise monitoring method and system. The system includes a sound pressure obtaining device, which includes a semi-anechoic room with a 4U jig at the center thereof and microphones over the 4U jig, and a noise monitoring device which includes a server rack and a rack server management module RMC. The microphone is configured to measure sound pressure values of the 4U jig controlled by PWM input signals with different duty ratios. Node middle boards are provided in the server rack, each of which is connected to a fan control panel, the fan control panel is connected to a fan unit, the fan unit includes fans, and each node middle board is connected to the RMC. The RMC obtains a real-time duty ratio of a PWM input signal for the fan, and calculates a real-time sound pressure value based on the duty ratio of the PWM input signal.

8 Claims, 5 Drawing Sheets

(58) Field of Classification Search
CPC .... G01H 17/00; G01H 3/10; G10K 11/17823; G10K 11/17857; G10K 11/17873; G10K 11/17881; G10K 2210/11; H04R 5/027; H04R 5/04; H05K 7/20136–2019; H05K 7/20209; H05K 7/20554–2059

See application file for complete search history.

(56) References Cited

U.S. PATENT DOCUMENTS

| | | | | |
|---|---|---|---|---|
| 2010/0028134 | A1* | 2/2010 | Slapak | G10K 11/17873 415/119 |
| 2010/0252358 | A1* | 10/2010 | Rodrigues | G06F 1/20 181/206 |
| 2011/0123036 | A1* | 5/2011 | Barath | G10K 11/17861 381/71.3 |
| 2013/0076286 | A1* | 3/2013 | Patton | G10K 11/161 318/460 |
| 2013/0131886 | A1* | 5/2013 | Nitta | G06F 1/206 700/300 |
| 2014/0094973 | A1* | 4/2014 | Giaimo, III | G10K 11/1785 700/280 |
| 2016/0013745 | A1* | 1/2016 | North | G06F 1/1684 318/460 |

FOREIGN PATENT DOCUMENTS

| | | |
|---|---|---|
| CN | 105527017 A | 4/2016 |
| CN | 105698919 A | 6/2016 |
| CN | 106370289 A | 2/2017 |
| CN | 107677361 A | 2/2018 |
| WO | 2015162309 A1 | 10/2015 |

* cited by examiner

RACK SERVER NOISE MONITORING SYSTEM AND METHOD

CROSS REFERENCE TO RELATED APPLICATION

The present application is the US national phase of International Application No. PCT/CN2018/091072 filed on Jun. 13, 2018, which claims the priority to Chinese Patent Application No. 201710791008.8, titled "RACK SERVER NOISE MONITORING SYSTEM AND METHOD", filed on Sep. 5, 2017 with the China National Intellectual Property Administration, the disclosures of which are incorporated herein by reference in their entirety.

FIELD

The present disclosure relates to the technology field of server noise monitoring, and in particular, to a system and a method for monitoring noise of a rack server.

BACKGROUND

RMC (Rack Management Center) is a management module of a rack server.

PWM (Pulse Width Modulation) technology is applied to modulate a duty ratio of a pulse to control a rotational speed of a fan in a server. The greater the duty ratio is, the higher the rotational speed is.

In recent years, with a gradual increasing requirement for heat dissipation of a component such as a CPU, a hard disk, a memory or the like, a high-performance fan is used more and more in server design. Thus an issue of a rising noise value of a server arises, and it has aroused great attention. A declared noise value of a server is measured in a laboratory under a specific temperature and a specific pressure. In practical applications, a noise value of the server during operation is more important. However, a computer room does not have conditions for measuring the noise value, and the noise value of the server changes with the rotational speed of the fan in the server. A method for monitoring a real-time noise value of a server is absent at present.

Considering the above disadvantage in the conventional technology, it is necessary to provide a system and a method for monitoring noise of a rack server.

SUMMARY

The present disclosure is to provide a system and a method for monitoring noise of a rack server, to solve the technical problem of absence of monitoring a real-time noise value of a server.

To achieve the above objective, the following technical solution is provided according to the present disclosure.

A system for monitoring noise of a rack server includes a sound pressure function obtaining device and a noise monitoring device;

the sound pressure function obtaining device includes a semi-anechoic room, a 4U jig is provided at the center of the semi-anechoic room, multiple microphones are provided over the 4U jig, the 4U jig is located at the center of the multiple microphones, a distance between each of the multiple microphones and the ground is a first height, a horizontal distance between each of the multiple microphones and the 4U jig is a first horizontal distance, and each of the multiple microphones slopes downward by a first angle;

four test nodes and a test fan unit are provided in the 4U jig, the test fan unit includes multiple test fans and a test fan control panel, each of the multiple test fans is connected to the test fan control panel, and the test fan control panel is also connected with a PWM put signal setting unit;

the 4U jig simulates a minimum constituent unit of the rack server;

the PMW input signal setting unit is configured to set PMW input signals for the test fan running in different duty ratios, the duty ratio is in a range of 5 to 100% with an increment of 5%;

the microphone is configured to measure sound pressure values of the 4U jig controlled by the PWM input signals with different duty ratios;

the noise monitoring device includes a server rack and a rack server management module RMC, multiple node middle boards are provided in the server rack, each of the multiple node middle boards is connected to a fan control panel, each fan control panel is connected to a fan unit, each fan unit includes multiple fans, each of the node middle boards is connected to the rack server management module RMC;

the number of fans in the fan unit is the same as the number of fans in the test fan unit;

the rack server management module RMC is configured to obtain a real-time duty ratio of a PMW input signal for the fan, and calculate a real-time sound pressure value based on the duty ratio of the PMW input signal.

Further, the server rack includes an upper half rack and a lower half rack, the node middle boards include an upper node middle board and a lower node middle board, the upper node middle board is connected to an upper fan control panel, the lower node middle board is connected to a lower fan control panel;

the upper node middle board, the upper fan control panel and a fan unit connected to the upper fan control panel are arranged in the upper half rack;

the lower node middle board, the lower fan control panel and a fan unit connected to the lower fan control panel are arranged in the lower half rack;

fan units in the same half rack operate under the control of a same PWM input signal; and the rack server management module RMC is configured to obtain real-time duty ratios of PWM input signals of the upper half rack and the lower half rack, and calculate a total sound pressure value based on the real-time duty ratios of the PWM input signals of the upper half rack and the lower half rack.

Further, there are multiple upper node middle boards and multiple lower node middle boards.

Further, the first angle is 60 degrees, the first height is 1.5 m, and the first horizontal distance is 1 m.

Further, the number of the microphones is 4.

Further, the test fan unit includes three test fans, and the fan unit includes three fans.

The present disclosure further provides a technical solution in the following.

A method for monitoring noise of a rack server includes the following steps 1 to 4.

In step 1, a testing environment for a sound pressure function obtaining device is built.

In step 2, sound pressure values of a test fan unit of a 4U jig controlled by PWM input signals with different duty ratios is measured by a microphone.

In step 3, a correspondence relationship Lp=f (duty ratio) between the sound pressure value Lp of the test fan unit of the 4U jig and the duty ratio of the PMW input signal of the test fan unit is fitted.

In step 4, a noise value of the rack server is monitored in a real-time manner by a noise monitoring device.

Further, step 4 includes the following steps 4-1 to 4-4.

In step 4-1, a duty ratio of a PWM input signal of a corresponding fan unit is obtained by each node middle board.

In step 4-2, in-position information of an upper node middle board of an upper half rack and a duty ratio of a PWM input signal of the upper half rack are obtained by a rack server management module RMC, where the rack server operates in a half rack independent fan speed regulating mode, and all fan units in the upper half rack operate at a same speed under the control of a same PWM input signal duty ratio.

In step 4-3, in-position information of a lower node middle board of a lower half rack and a duty ratio of a PWM input signal of the lower half rack are obtained by the rack server management module RMC, where the rack operates in the half rack independent fan speed regulating mode, and all fan units in the lower half rack operate at a same speed under the control of a same PWM input signal duty ratio.

In step 4-4, a sound pressure value of the fan units of the upper half rack, a sound pressure value of the fan units of the lower half rack, and a total noise value of the rack server are calculated by the rack server management module RMC based on the principle of noise superposition.

Further, step 4-4 includes:

calculating the sound pressure value of the fan units of the lower half rack according to an equation of: Lp_lower=f (the duty ratio for the lower half rack)+10 lgn;

calculating the sound pressure value of the fan units of the upper half rack according to an equation of: Lp_upper=f (the duty ratio for the upper half rack)+10 lgm; and calculating the total noise value of the rack server according to an equation of:

$$\begin{aligned}\text{Lp\_total} &= 10lg\big(10^{Lp\_lower/10} + 10^{Lp\_upper/10}\big) = \\ &\quad 10lg(10^{f(\text{the duty ratio for the lower half rack})/10+10lgn/10} + \\ &\quad 10^{f(\text{the duty for the upper half rack})+10lgm/10}) = \\ &\quad 10lg(10^{f(\text{the duty ratio for the lower half rack})/10+lgn} + \\ &\quad 10^{f(\text{the duty ratio for the upper half rack})+lgm});\end{aligned}$$

where n is the number of fan units of the lower half rack, m is the number of fan units of the upper half rack, Lp_lower is the sound pressure value of the lower half rack, Lp_upper is the sound pressure value of the upper half rack, and Lp_total is the total noise value.

Advantageous effects of the present disclosure are described as follows.

A noise value of a rack server is monitored in real time. The noise value of a server is an important index by which running stability of the server may be judged. The rack server having the function of monitoring the noise value in real time is competitive.

In addition, the system for monitoring a noise value of a rack server provided by the present disclosure is reliable in design, and is simple in structure, thus has broad application prospects.

In view of the above, compared with conventional technology, the present disclosure has outstanding substantive features and significant progress, and therefore apparent beneficial effects.

The meanings of references described hereinafter are illustrated as follows:

1—4U jig; 2—microphone; 2.1—first microphone; 2.2—second microphone; 2.3—third microphone; 2.4—fourth microphone; 3—test fan control panel; 4—PWM input signal setting unit; 5—test fan unit; 5.1—first test fan; 5.2—second test fan; 5.3—third test fan; 6—rack server management module RMC; 7.1—first upper node middle board; 7.2—second upper node middle board; 7.3—third upper node middle board; 8.1—first lower node middle board; 8.2—second lower node middle board; 9.1—first upper fan control panel; 9.2—second upper fan control panel; 9.3—third upper fan control panel; 10.1—first lower fan control panel; 10.2—second lower fan control panel; 11.1—first fan unit; 11.2—second fan unit; 11.3—third fan unit; 11.4—fourth fan unit; 11.5—fifth fan unit; 12.1—first fan; 12.2—second fan; 12.3—third fan; 12.4—fourth fan; 12.5—fifth fan; 12.6—sixth fan; 12.7—seventh fan; 12.8—eighth fan; 12.9—ninth fan; 12.10—tenth fan; 12.11—eleventh fan; 12.12—twelfth fan; 12.13—thirteenth fan; 12.14—fourteenth fan; 12.15—fifteenth fan.

DETAILED DESCRIPTION

Following is a clear and complete description of the technical solutions of the present disclosure with reference to the accompanying drawings in the present disclosure, to make objective, features and advantages of the present disclosure more straightforward.

The present disclosure provides a system for monitoring a noise of a rack server, which includes a sound pressure function obtaining device and a noise monitoring device.

Figure 1:
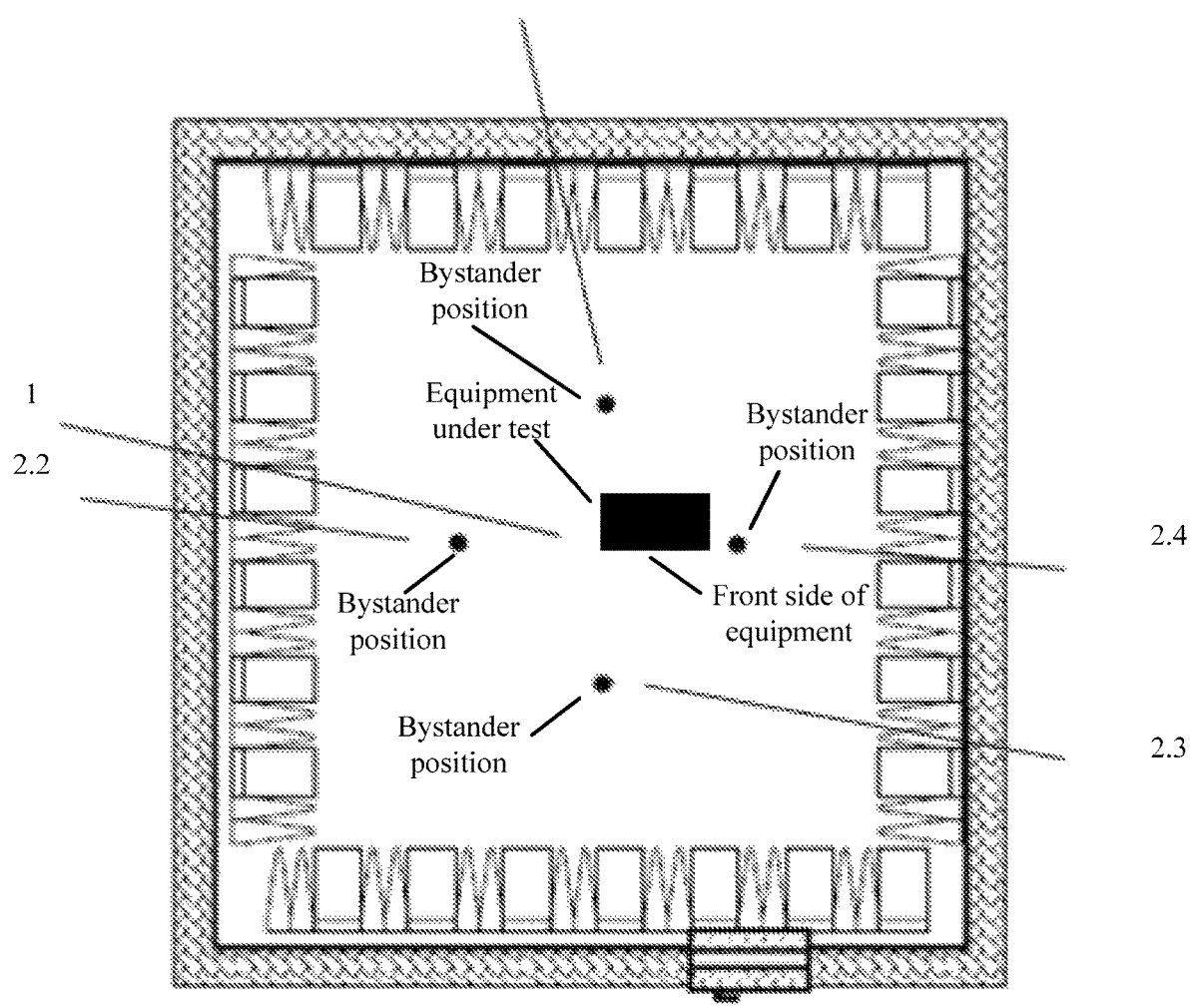
FIG. 1 is a top view of a semi-anechoic room in a sound pressure function obtaining device.
Figure 2:
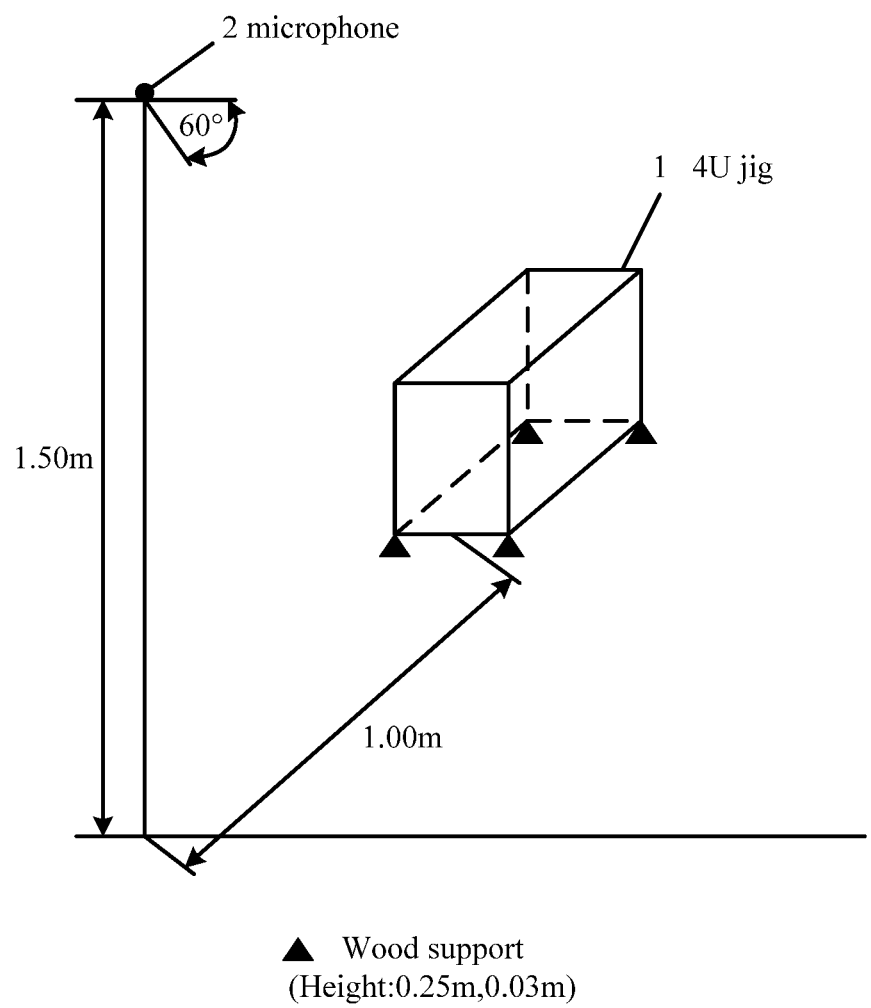
FIG. 2 is a schematic diagram illustrating a relative position of microphones and a 4U jig.
Figure 3:
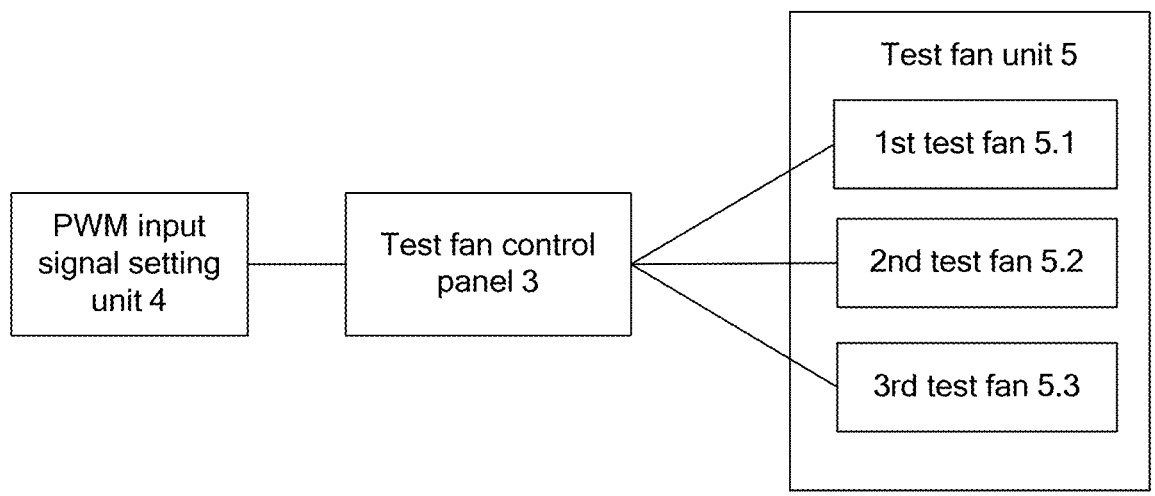
FIG. 3 is a schematic connection diagram of fans in a 4U jig.

As shown in FIGS. 1-3, the sound pressure function obtaining device includes a semi-anechoic room, a 4U jig 1 is provided at the center of the semi-anechoic room, four microphones 2 are provided over the 4U jig 1, where the four microphones 2 include a first microphone 2.1, a second microphone 2.2, a third microphone 2.3 and a fourth microphone 2.4; the 4U jig 1 is located at the center of the four microphones 2, a distance between each of the four microphones 2 and the ground is 1.5 m, a horizontal distance between each of the four microphones 2 and the 4U jig 1 is 1 m, and each of the four microphones 2 slopes downward by an angle of 60 degrees;

four test nodes and a test fan unit 5 are provided in the 4U jig 1, the test fan unit 5 includes a first test fan 5.1, a second test fan 5.2, a third test fan 5.3 and a test fan control panel 3, any one of the first test fan 5.1, the second test fan 5.2 and the third test fan 5.3 is connected to the test fan control panel 3, and the test fan control panel 3 is also connected with a PWM input signal setting unit 4;

the PWM input signal setting unit 4 is configured to set PWM input signals for the test fan running in different duty ratios, the duty ratio is in a range of 5% to 100% with an increment of 5%;

the microphones 2 are configured to measure sound pressure value of the 4U jig 1 controlled by the PWM input signals with different duty ratios.

Figure 4:
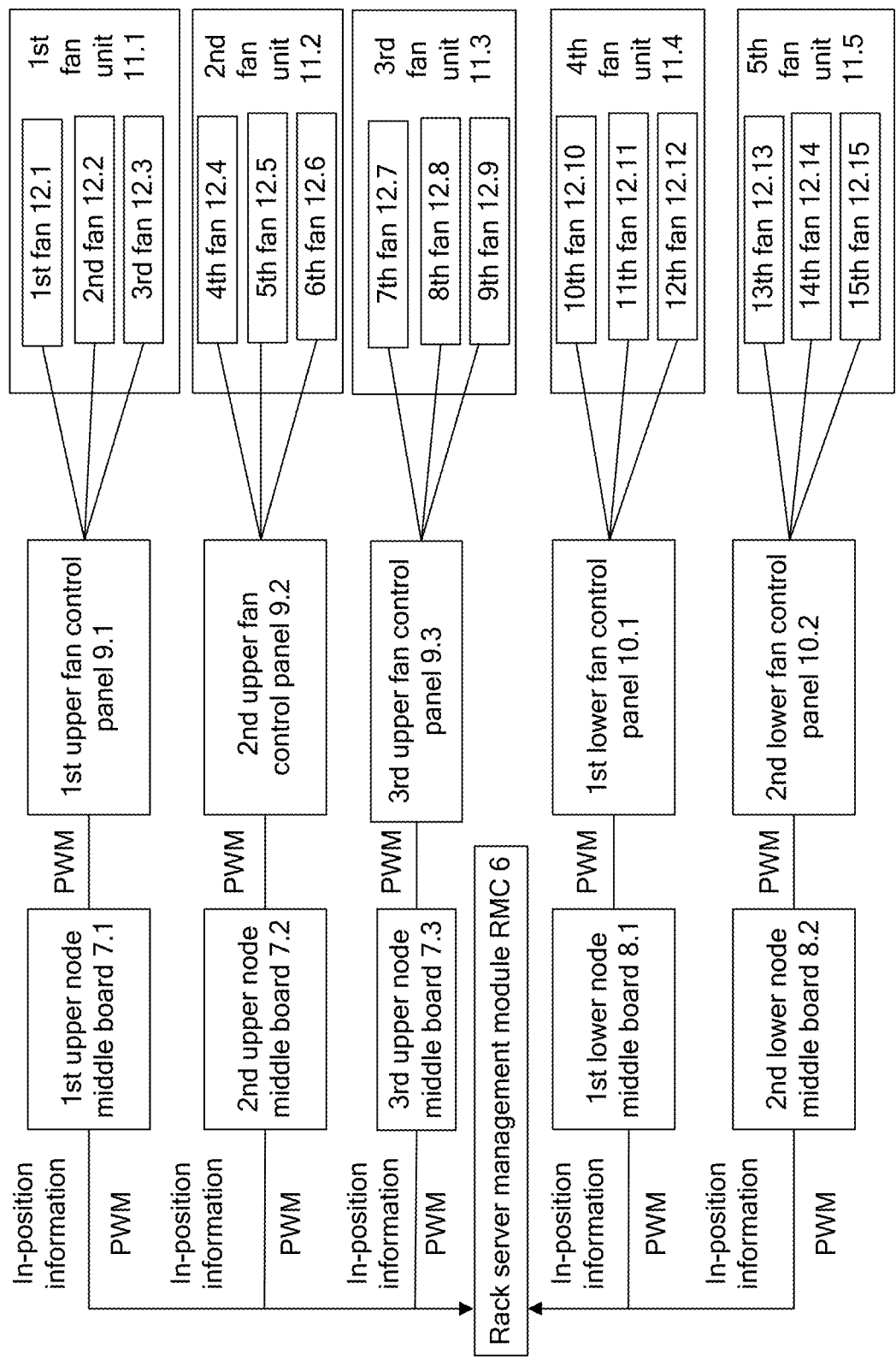
FIG. 4 is a schematic connection diagram a noise monitoring device.

As shown in FIG. 4, the noise monitoring device includes a server rack and a rack server management module RMC 6, and the server rack includes an upper half rack and a lower half rack;

the upper half rack is provided with three upper node middle boards: a first upper node middle board 7.1, a second upper node middle board 7.2 and a third upper node middle board 7.3;

the first upper node middle board 7.1 is connected to a first upper fan control panel 9.1, the first upper fan control panel 9.1 is connected to a first fan unit 11.1, the first fan unit 11.1 includes a first fan 12.1, a second fan 12.2 and a third fan 12.3;

the second upper node middle board 7.2 is connected to a second upper fan control panel 9.2, the second upper fan control panel 9.2 is connected to a second fan unit 11.2, the second fan unit 11.2 includes a fourth fan 12.4, a fifth fan 12.5 and a sixth fan 12.6;

the third upper node middle board 7.3 is connected to a third upper fan control panel 9.3, the third upper fan control panel 9.3 is connected to a third fan unit 11.3, the third fan unit 11.3 includes a seventh fan 12.7, an eighth fan 12.8 and a ninth fan 12.9;

the lower half rack is provided with two lower node middle boards: a first lower node middle board 8.1 and a second lower node middle board 8.2;

the first lower node middle board 8.1 is connected to a first lower fan control panel 10.1, the first lower fan control panel 10.1 is connected to a fourth fan unit 11.4, the fourth fan unit 11.4 includes a tenth fan 12.10, an eleventh fan 12.11 and a twelfth fan 12.12;

the second lower node middle board 8.2 is connected to a second lower fan control panel 10.2, the second lower fan control panel 10.2 is connected to a fifth fan unit 11.5, the fifth fan unit 11.5 includes a thirteenth fan 12.13, a fourteenth fan 12.14 and a fifteenth fan 12.15;

the first upper node middle board 7.1, the second upper node middle board 7.2, the third upper node middle board 7.3, the first lower node middle board 8.1, and the second lower node middle board 8.2 are all connected to the rack server management module RMC 6;

the first fan unit 11.1, the second fan unit 11.2 and the third fan unit 11.3 of the upper half rack operate under the control of a same PWM input signal;

the fourth fan unit 11.4, the fifth fan unit 11.5 and the sixth fan unit 11.6 of the lower half rack operate under the control of a same PWM input signal; and the rack server management module RMC 6 is configured to obtain real-time duty ratios of PWM input signals of the upper half rack and the lower half rack, and calculate a total sound pressure value based on the real-time duty ratios of the PWM input signals of the upper half rack and the lower half rack.

Figure 5:
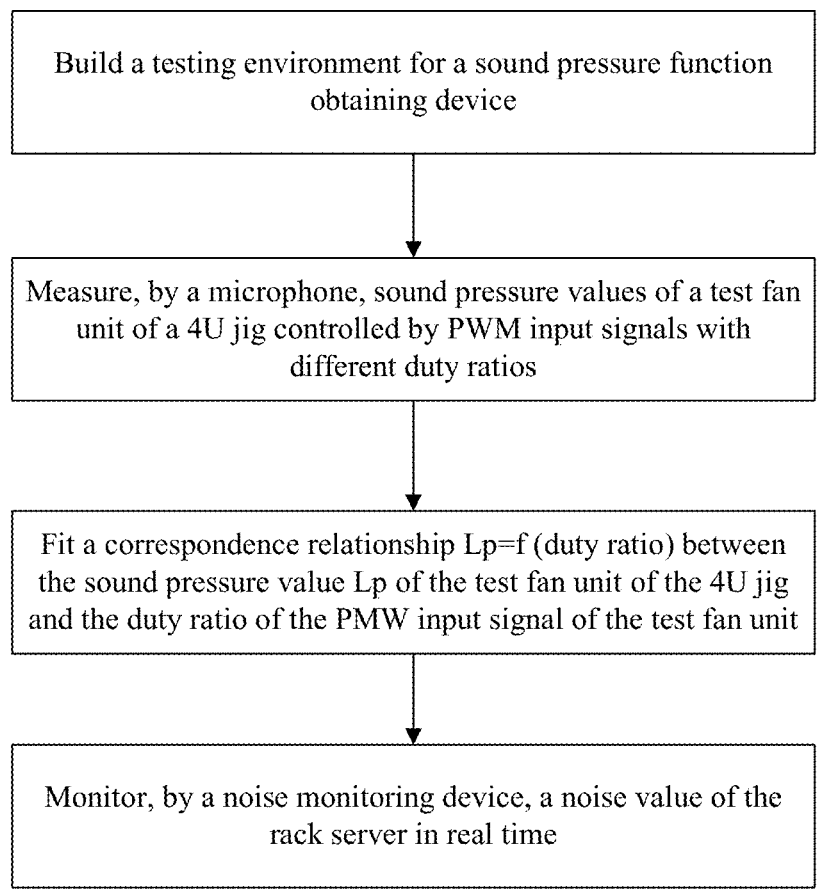
FIG. 5 is a method flow chart according to the present disclosure.

As shown in FIG. 5, a method for monitoring noise of a rack server is further provided according to the present disclosure. The method includes the following steps 1 to 4 and steps 4-1 to 4-4.

In step 1, a testing environment for the sound pressure function obtaining device as shown in FIGS. 1 to 3 is built.

In step 2, sound pressure values of a test fan unit of a 4U jig controlled by PWM input signals with different duty ratios is measured by a microphone.

In step 3, a correspondence relationship Lp=f (duty ratio) between the sound pressure value Lp of the test fan unit of the 4U jig and the duty ratio of the PMW input signal of the test fan unit is fitted.

In step 4, a noise value of the rack server is monitored in real time by the noise monitoring device as shown in FIG. 4.

In step 4-1, each node middle board obtains a duty ratio of a PWM input signal of a corresponding fan unit.

In step 4-2, the rack server management module RMC 6 obtains that in-position upper node middle boards of the upper half rack are a first upper node middle board 7.1, a second upper node middle board 7.2 and a third upper node middle board 7.3 and a duty ratio of a PWM input signal of the upper half rack is 65%, where the rack server operates in a half rack independent fan speed regulating mode and all fan units in the upper half rack operate at a same speed under the control of the duty ratio of 65%.

In step 4-3, the rack server management module RMC 6 obtains that in-position lower node middle boards of the lower half rack are a first lower node middle board 8.1 and a second lower node middle board 8.2 and a duty ratio of a PWM input signal of the lower half rack is 85%, where the rack server operates in a half rack independent fan speed regulating mode, and all fan units in the lower half rack operate at a same speed under the control of the duty ratio of 85%.

In step 4-4, the rack server management module RMC 6 calculates a sound pressure value of the fan units of the upper half rack, a sound pressure value of the fan units of the lower half rack, and a total noise value of the rack server based on the principle of noise superposition, $$\text{where Lp\_lower} = f(85\%) + 10lg2;$$

$$\text{Lp\_upper} = f(65\%) + 10lg3; \text{ and}$$

$$\text{Lp\_total} = 10lg(10^{Lp\_lower/10} + 10^{Lp\_upper/10}) =$$

$$10lg(10^{f(85\%)/10+10lg2/10} + 10^{f(65\%)+10lg3/10}) =$$

$$10lg(10^{f(85\%)/10+lg2} + 10^{f(65\%)+lg3}),$$

where the number n of fan units of the lower half rack is 2, the number m of fan units of the upper half rack is 3, Lp_lower is the sound pressure value of the lower half rack, Lp_upper is the sound pressure value of the upper half rack, and Lp_total is the total noise value.

The embodiments described above are illustrative rather than limiting. The above description for embodiments is only for understanding the method and system of the present disclosure, and the present disclosure is not limited to the embodiments in the detailed description. Other embodiments made by those skilled in the art based on the technical solutions of the present disclosure shall also fall within the scope of the present disclosure.

The invention claimed is:

1. A system for monitoring noise of a rack server, comprising: a sound pressure function obtaining device and a noise monitoring device;

wherein the sound pressure function obtaining device comprises a semi-anechoic room, a 4U jig is provided at the center of the semi-anechoic room, a plurality of microphones are provided over the 4U jig, and the 4U jig is located at the center of the plurality of microphones;

a distance between each of the plurality of microphones and the ground is a first height, a horizontal distance between each of the plurality of microphones and the 4U jig is a first horizontal distance, and each of the plurality of microphones slopes downward by a first angle;

four test nodes and a test fan unit are provided in the 4U jig, the test fan unit comprises a plurality of test fans and a test fan control panel, each of the plurality of test fans is connected to the test fan control panel, and the test fan control panel is also connected with a pulse width modulation (PWM) input signal setting unit;

the PWM input signal setting unit is configured to set PWM input signals for the test fan unit running in different duty ratios;

the microphones are configured to measure sound pressure values of the 4U jig controlled by the PWM input signals with different duty ratios;

the noise monitoring device comprises a server rack and a rack server management module RMC, a plurality of node middle boards are provided in the server rack, each of the plurality of node middle boards is connected to a fan control panel, the fan control panel is connected to a fan unit, the fan unit comprises a plurality of fans, each of the plurality of node middle boards is connected to the rack server management module RMC;

the number of the fans in the fan unit is the same as the number of the fans in the test fan unit; and the rack server management module RMC is configured to obtain a real-time duty ratio of a PWM input signal for the fan unit, and calculate a real-time sound pressure value based on the duty ratio of the PWM input signal.

2. The system for monitoring noise of a rack server according to claim 1, wherein the server rack comprises an upper half rack and a lower half rack, the node middle board comprises an upper node middle board and a lower node middle board, the upper node middle board is connected to an upper fan control panel, and the lower node middle board is connected to a lower fan control panel;

the upper node middle board, the upper fan control panel and a fan unit connected to the upper fan control panel are arranged in the upper half rack;

the lower node middle board, the lower fan control panel and a fan unit connected to the lower fan control panel are arranged in the lower half rack;

fan units in the same half rack operate under the control of a same PWM input signal; and the rack server management module RMC is configured to obtain real-time duty ratios of PWM input signals of the upper half rack and the lower half rack, and calculate a total sound pressure value based on the real-time duty ratios of the PWM input signals of the upper half rack and the lower half rack.

3. The system for monitoring noise of a rack server according to claim 2, wherein the number of the upper node middle board is more than one, and the number of the lower node middle board is more than one.

4. The system for monitoring noise of a rack server according to claim 1, wherein the first angle is 60 degrees, the first height is 1.5 m, and the first horizontal distance is 1 m.

5. The system for monitoring noise of a rack server according to claim 1, wherein the number of the microphones is 4.

6. The system for monitoring noise of a rack server according to claim 1, wherein the test fan unit comprises three test fans, and the fan unit comprises three fans.

7. A method for monitoring noise of a rack server, comprising:

a step 1 of building a testing environment for a sound pressure function obtaining device;

a step 2 of measuring, by a microphone, sound pressure values of a test fan unit of a 4U jig controlled by pulse width modulation (PWM) input signals with different duty ratios;

a step 3 of fitting a correspondence relationship Lp=f (duty ratio) between the sound pressure value Lp of the test fan unit of the 4U jig and the duty ratio of the PWM input signal of the test fan unit; and a step 4 of monitoring, by a noise monitoring device, a noise value of the rack server in a real-time manner, wherein the step 4 comprises:

a step 4-1 of obtaining, by each node middle board, a duty ratio of a PWM input signal of a corresponding fan unit;

a step 4-2 of obtaining, by a rack server management module RMC, in-position information of an upper node middle board of an upper half rack and a duty ratio of a PWM input signal of the upper half rack;

a step 4-3 of obtaining, by the rack server management module RMC, in-position information of a lower node middle board of a lower half rack and a duty ratio of a PWM input signal of the lower half rack; and a step 4-4 of calculating, by the rack server management module RMC, a sound pressure value of the fan units of the upper half rack, a sound pressure value of the fan units of the lower half rack, and a total noise value of the rack server based on the principle of noise superposition.

8. The method for monitoring noise of a rack server according to claim 7, wherein the step 4-4 comprises:

calculating the sound pressure value of the fan units of the lower half rack according to an equation of: Lp_lower=f (the duty ratio for the lower half rack)+10 lgn;

calculating the sound pressure value of the fan units of the upper half rack according to an equation of: Lp_upper=f (the duty ratio for the upper half rack)+10 lgm; and calculating the total noise value of the rack server according to an equation of:

$$Lp\_total=10\lg(10^{Lp\_lower/10}+10^{Lp\_upper/10})=10\lg(10^{f(\text{the duty ratio for the lower half rack})/10+\lg n}+10^{f(\text{the duty ratio for the upper half rack})+\lg m});$$

wherein n is the number of fan units of the lower half rack, m is the number of fan units of the upper half rack, Lp_lower is the sound pressure value of the lower half rack, Lp_upper is the sound pressure value of the upper half rack, and Lp_total is the total noise value.

* * * * *